Patented July 10, 1934

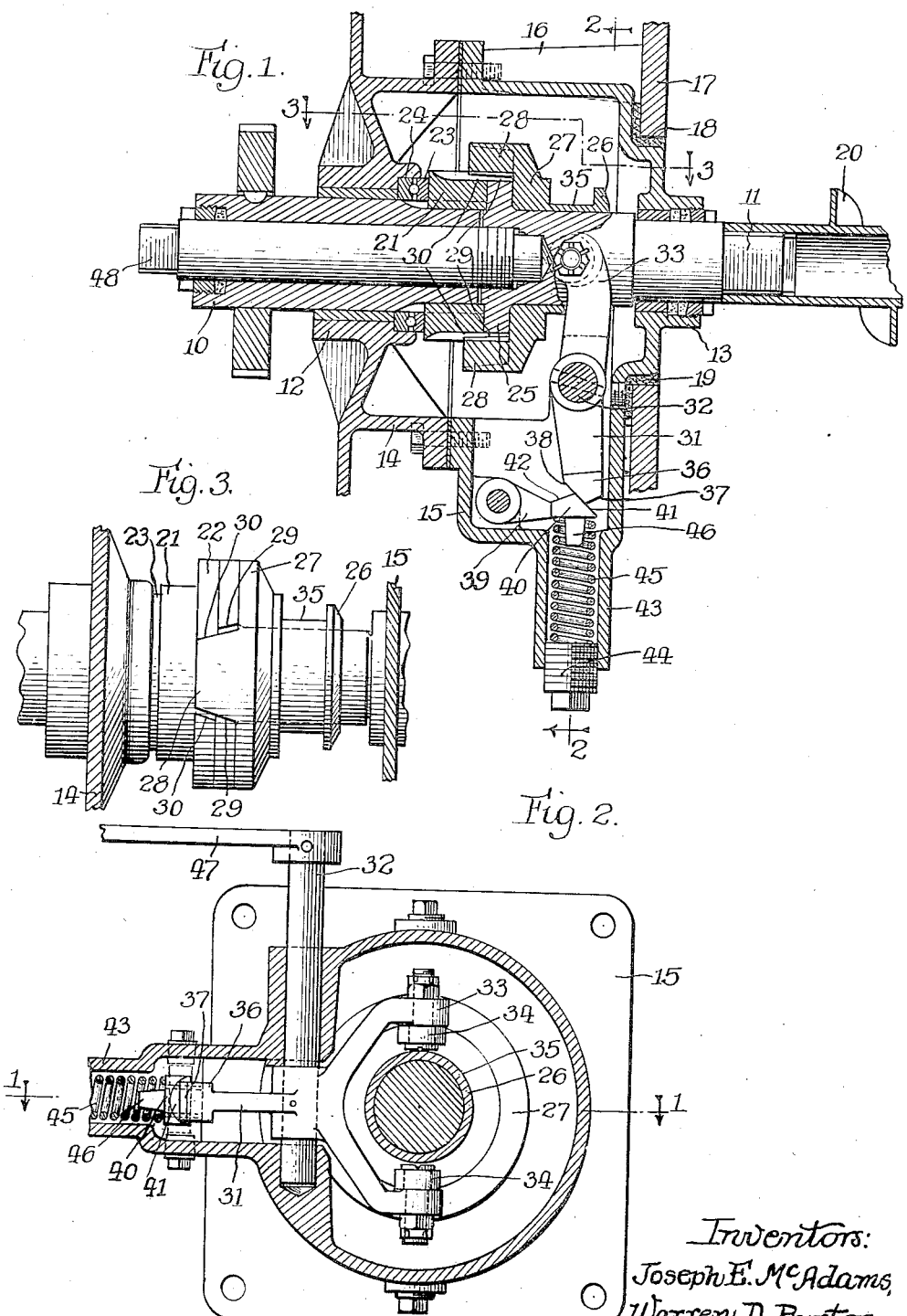

1,966,100

UNITED STATES PATENT OFFICE 1,966,100

POWER TRANSMISSION MECHANISM

Joseph E. McAdams, Dayton, Ohio, and Warren D. Burton, Goshen, Ind., assignors to Combustioneer, Inc., Goshen, Ind., a corporation of Illinois Application November 15, 1930, Serial No. 495,906

12 Claims. (Cl. 192—56)

The present invention relates to improvements in power transmission mechanisms of the type which will be effective to disconnect the drive to a driven part in the event of an excessive load.

The invention is particularly adapted for use in mechanical stokers of the underfeed type in which fuel is fed by a power driven screw conveyor from a hopper through a conveyor duct into the bottom of a retort.

The fuel supplied to the hopper often contains foreign objects, such as pieces of iron, steel or rock, which will not crush. Frequently, these objects form obstructions at the outlet of the hopper, thereby clogging the apparatus. In this event, if the drive for the screw conveyor is not disconnected, serious damage to the apparatus may result. To avoid the possibility of such damage, it is common to interpose a member in the drive for the screw conveyor which will shear when subjected to a force somewhat in excess of the force required in normal operation, and which can be readily replaced. If an obstruction in the hopper causes a break down in the operation, obviously, the obstruction must be removed and a new shear member must be provided before the operation can be started again. This involves inconvenience and often a considerable loss of time.

The primary object of the present invention resides in the provision of a novel power transmission mechanism including a clutch in the drive which will be opened automatically when subjected to a load in excess of a predetermined maximum. Thus, if connected to the screw conveyor of a stoker, the mechanism would constitute a safety cut-out device operable to disengage the power drive if an obstruction in the fuel should bind the conveyor against rotation or subject same to a force substantially in excess of the normal operating force.

Another object is to provide a novel transmission mechanism of the foregoing character in which the clutch when opened will remain open until manually reset.

Still a further object is to provide a new and improved power transmission mechanism of the foregoing character in which the movable element of the clutch will not lock tight nor work loose, and is not subjected to excessive friction upon movement into its open and closed positions.

A general object of the invention resides in the provision of a novel power transmission mechanism of the foregoing character which is simple, compact and inexpensive in construction, which is efficient, sensitive and reliable in operation, which is adjustable to open at different loads, and which when subjected to a predetermined load will open readily.

Further objects and advantages will become apparent as the description proceeds.

In the accompanying drawing, Figure 1 is a fragmentary horizontal sectional view taken along line 1—1 of Fig. 2 of a transmission mechanism embodying the features of our invention.

Fig. 2 is a transverse sectional view taken substantially along line 2—2 of Fig. 1.

Fig. 3 is a vertical sectional view taken along line 3—3 of Fig. 1.

While the invention is susceptible of various modifications and alternative constructions, we have shown in the drawing and will herein describe in detail the preferred embodiment, but it is to be understood that we do not thereby intend to limit the invention to the specific form disclosed, but intend to cover all modifications and alternative constructions falling within the spirit and scope of the invention as expressed in the appended claims.

Referring more particularly to the drawing, the mechanism constituting the exemplary embodiment of the invention comprises generally a driving shaft 10 and a driven shaft 11. Preferably, the shafts 10 and 11 are suitably journaled in bearings 12 and 13 in axial alinement respectively in the opposed end walls of two hollow sections 14 and 15 bolted together to form a suitable housing. One of the sections, for example the section 15, is rigidly mounted on a plurality of legs 16 extending from a support 17 which may constitute one wall of a fuel hopper (not shown). Preferably, the bearing 13 extends freely into an opening 18 formed in the support 17, and the space between the section 15 and the support and about the bearing is filled with a cement 19 to provide a dust seal.

The driving shaft 10 is adapted to be connected to a suitable source of power, as for example a variable speed gear drive (not shown) mounted on the housing section 14. The driven shaft 11 is adapted for connection to a machine part, such as the screw conveyor 20 of an underfeed stoker.

Splined on the inner end of the driving shaft 10 within the housing is a clutch element 21 having a peripheral flange 22 on its free end. A suitable anti-friction bearing 23 mounted in a recess 24 in the inner end of the bearing 12 engages the adjacent end of the clutch element 21. A peripheral flange 25 on the driven shaft 11 a short distance from the inner end bears against the flange 22 and is substantially coextensive in diameter therewith. The clutch element 21 fits onto the inner end of the shaft 11, and is held against the bearing 23 by the flange 25. It will be evident that when desired the shaft 10 may be readily withdrawn from the clutch element 21, and that the latter will be held in position axially and radially to receive the shaft 10 when making the assembly.

A driven clutch element 26 is slidably and rotatably mounted on the shaft 11, and has a peripheral flange 27 on one end adapted to be moved against the flange 25.

Suitable means is provided for operatively connecting the clutch element 26 to the shaft 11, and in the present instance this means comprises one or more lugs 28 extending from the end face of the flange 27 through a corresponding number of notches 29 formed in the periphery of the flange 25. Preferably, two diametrically opposed lugs 28 and two correspondingly spaced notches 29 are provided, the notches being somewhat wider than the lugs to permit limited relative rotation of the clutch element 26 on the shaft 11.

A separable drive connection also is provided between the clutch elements 21 and 26. To this end, a pair of diametrically opposed notches 30 are formed in the periphery of the flange 22, and are adapted to be located in substantial registration with the notches 29. The notches 30 are somewhat wider than the lugs 28 and are adapted to receive the ends of the latter when the clutch element 26 is positioned against the flange 25 on the shaft 11.

The coacting faces of the lugs 28 on one hand and the notches 29 and 30 on the other hand are inclined at an angle longitudinally of the shafts 10 and 11 so as to exert an end thrust on the lugs tending to break the clutch connection upon the application of rotational force. The pressure or friction angle of the faces on the lugs 28 and the notches 29 and 30 is slight, and is such that upon the application of a given yieldable end pressure on the clutch element 26 tending to establish the clutch connection, the interfitting faces will not bind and yet will not tend to work loose under a normal rotational torque, but upon the application of an excessive rotational torque will disengage easily. Since the clutch element 26 is freely rotatable on the shaft 11 and since the coacting faces of the clutch elements and the shaft are inclined, no binding or substantial frictional resistance, such as would result from the use of a sliding key connection between the hub of the clutch element and the shaft, will be set up tending to resist axial adjustment of the clutch element. Hence, a clutch connection accurately sensitive to the rotational force is obtained.

Suitable means is provided tending to hold the clutch element 26 yieldingly in open or closed position, and hence to oppose the end thrust of the coacting clutch faces when the clutch element 26 is in closed position. This means, in the present instance, comprises a horizontal lever 31 secured intermediate its ends on a shaft 32 journaled in the housing section 15. The inner end of the lever 31 has a yoke 33, the arms of which carry rollers 34 engaging at diametrically opposite points in a peripheral groove 35 formed in the hub of the driven clutch element 26. The outer end of the lever 31 is formed with a head 36 having oppositely inclined cam faces 37 and 38. A latch 39 is pivotally mounted in the housing section 15, and is formed on its free end with a head 40 having oppositely inclined cam faces 41 and 42 adapted to coact respectively with the faces 37 and 38. Disposed in a tubular sleeve 43 projecting from one side of the housing section 15 and seated against an adjustable plug 44 closing the outer end of the sleeve is a coiled compression spring 45, the inner end of which impinges against the head 40, and which serves to hold the latter with a predetermined force against the head 36. A pin 46 on the head 40 extends into the inner end of the spring 45, and serves to hold the latter in position.

It will be evident that when the cam faces 38 and 41 are in engagement, the spring 45 acting through the latch 39 and the lever 31 will hold the clutch element 26 yieldingly in closed position. Referring to Fig. 3, the lagging face of each notch 30 will engage the lagging face of the related lug 28, and the leading face of the latter will engage the leading face of the related notch 29 to transmit the rotation of the driving clutch element 21 directly through the lugs to the shaft 11. In the event that the rotational force necessary to drive the shaft 11 exceeds a predetermined maximum, the coacting clutch faces will force the clutch element 26 away from the flange 25 against the action of the spring 45 sufficiently to separate the lugs 28 from the notches 30. Thereupon, the cam faces 37 and 42 will be brought into engagement so that the spring 45 acting through the latch 39 and the lever 31 will hold the clutch element 26 yieldingly in open position.

The cam faces 37 and 42 are disposed at a smaller angle relatively to the path of the head 36 than the faces 38 and 41 so that the clutch element 26 may be readily returned into closed position. To provide means for manually actuating the clutch element 26, the shaft 32 is extended out of the housing, and is provided on its outer end with a hand lever 47. It will be evident that when the clutch element 26 is moved automatically into open position, it will be held in such position until reset through manual actuation of the lever 47.

Extending through the shaft 10 and threaded into the inner end of the shaft 11 is a shaft 48 which affords means for rotating the shaft 11 manually when the clutch element 26 is in open position. The threaded connection has a lead such that it will tend to tighten upon turning the shaft 11 in a reverse direction. This is a desirable feature in coal stokers where it is often necessary to turn the screw conveyor backwards to release same from an obstruction. The threaded connection, however, is sufficiently tight normally to permit turning the shaft 11 in either direction.

It will be noted that the shaft 48 when the power drive is connected, constitutes a reduced extension of the driven shaft 11 which projects into the driving shaft 10, and thus assists in supporting the end of the driven shaft and in assuring axial alinement.

We claim as our invention:

1. In a power transmission mechanism, in combination, a driving member, an alined driven member, a clutch element mounted on one of said members, a second clutch element mounted on the other of said members, one of said elements being movable into and out of coacting engagement with the other of said elements, a reversible actuator secured to the movable clutch element, said actuator being formed with two oppositely inclined faces, a detent formed with similarly inclined faces adapted to coact respectively with said first mentioned faces to hold said movable clutch element selectively in closed or open position, spring means for pressing said detent against said actuator, and means for adjusting said spring means, the coacting cam faces for holding said movable clutch element in closed position having a greater inclination than the coacting cam faces for holding said movable clutch element in open position.

2. In a power transmission mechanism, in combination, opposed end sections constituting a housing, a driving shaft journaled in one section, a driven shaft journaled in the other section, said shafts being disposed in axial alinement, a peripheral flange on said driven shaft, said flange being formed in its periphery with two diametrically opposed notches each having sides oppositely inclined longitudinally of said shafts, a driving clutch element splined to said driving shaft and formed with a peripheral flange bearing against said first mentioned flange, said last mentioned flange being formed in its periphery with two diametrically opposed notches having sides inclined similarly to said first mentioned sides, a driven clutch element slidably and rotatably mounted on said driven shaft, said driven clutch element being formed with two diametrically opposed tapered lugs adapted to enter said notches and less in width than said notches, a lever pivotally mounted in said housing and having a yoke on one end engaging said driven clutch element, the other end of said lever being formed with oppositely inclined cam faces, a latch pivotally mounted in said housing and formed on its free end with oppositely inclined cam faces adapted for respective engagement with said first mentioned faces, and spring means engaging said latch for urging said faces into engagement.

3. In a power transmission mechanism, in combination, opposed end sections constituting a housing, a driving shaft, a driven shaft, said shafts being journaled in said housing in axial alinement, a peripheral flange on said driven shaft, said flange being formed in its periphery with a notch having sides oppositely inclined longitudinally of said shafts, a clutch element longitudinally splined on one end of said driving shaft for relative axial movement in assembly or disassembly, a peripheral flange on said element adjacent said first mentioned flange, said last mentioned flange being formed in its periphery with a notch having sides inclined similarly to said first mentioned sides, a clutch element slidably and rotatably mounted on said driven shaft, said last mentioned clutch element being formed with a tapered lug adapted to enter said notches and less in width than said notches, and pressure means acting on said driven clutch element tending to move said lug into said notches.

4. In a power transmission mechanism, in combination, a driving shaft, a driven shaft, said shafts being disposed in axial alinement, one of said shafts being formed with a longitudinally tapering notch, a clutch element slidably splined on the other of said shafts and formed with a similarly tapering notch, a concentric end-thrust bearing to limit sliding movement of said element in one direction, a second clutch element slidably mounted on said one shaft and having a longitudinal lug tapered similarly to said notches, said lug being less in width than said notches, and movable into and out of said last mentioned notch, and yieldable pressure means acting on said last mentioned clutch element tending to move said lug into said last mentioned notch, the angle of taper of said notches and lug being such as to cause an end thrust in the direction of said end thrust bearing in proportion to the resistance to rotation of said driven shaft.

5. In a transmission mechanism, in combination, a hollow driving shaft, an axially alined driven shaft, separable coacting clutch elements respectively on said shafts for normally driving said driven shaft from said driving shaft in one direction, and a shaft extending through said hollow shaft and having a threaded connection with said driven shaft for adjusting the latter manually in the other direction, said connection having a lead such that it will tend to tighten upon rotating said driven shaft in the other direction.

6. In a power transmission mechanism, in combination, a bearing, a driving shaft slidably mounted in said bearing, said bearing being formed with a concentric bearing seat, an annular end-thrust anti-friction bearing mounted in said seat, a driven shaft journaled in axial alinement with said driving shaft, and having a peripheral shoulder adjacent its end next to said driving shaft, a clutch element slidably splined on said driving shaft and rotatable on said end of said driven shaft, said element being disposed in end abutting engagement with said anti-friction bearing and said shoulder, and a clutch element on said driven shaft movable into and out of engagement with said first mentioned clutch element.

7. In a power transmission mechanism, in combination, a bearing, a shaft slidably mounted in said bearing, an annular end-thrust bearing disposed against one end of said first mentioned bearing, a second shaft journaled in axial alinement with the slidable shaft, and having a peripheral shoulder adjacent its end next to said slidable shaft, a clutch element slidably splined on said slidable shaft and rotatable on said end of said second shaft, said element being disposed in end abutting engagement with said end-thrust bearing and said shoulder, and a clutch element on said second shaft movable into and out of engagement with said first mentioned clutch element.

8. In a transmission mechanism, in combination, a hollow driving shaft, an axially alined driven shaft, separable coacting clutch elements on said respective shafts for operating said driven shaft from said driving shaft, and a shaft extending through said hollow shaft and having a detachable connection with said driven shaft for adjusting the latter manually.

9. In a power transmission mechanism, in combination, a bearing, a driving shaft slidably mounted in said bearing, an annular end-thrust anti-friction bearing concentric with said first mentioned bearing, a driven shaft journaled in axial alinement with said driving shaft with its end in juxtaposition therewith; a clutch element slidably splined on said driving shaft and projecting externally of the end thereof to rotatably support the juxtaposed end of said driven shaft, a peripheral shoulder on said driven shaft adjacent the end thereof, said clutch element being disposed in end abutting engagement between said anti-friction bearing and said shoulder, and means operable to provide a driving engagement between said element and said driven shaft.

10. In a power transmission mechanism, the combination of a slidably and rotatably supported driving shaft, an axially alined rotatably supported driven shaft held against longitudinal movement away from said driving shaft, a clutch element longitudinally splined on said slidable shaft and rotatably supporting one end of said driven shaft, an annular end-thrust bearing concentric with said driving shaft, a peripheral shoulder on said driven shaft, said element being disposed in end abutting engagement between said end-thrust bearing and said shoulder, a clutch element slidably and rotatably mounted on said driven shaft, a longitudinally tapered lug on said second mentioned clutch element, said lug being adapted to be received in similarly shaped notches formed in said first mentioned element and said shoulder, and yieldable means tending to move said lug into engagement with said notches, resistance to movement of said driven shaft acting through said tapered lug and notches to exert a longitudinal force resisted by said end thrust bearing effective in one direction and acting in an opposite direction to force said lug out of said notches.

11. In a power transmission mechanism, a driving shaft, a driven shaft, said shafts being disposed in axial alinement, an end thrust bearing mounted in fixed position, a clutch element slidably splined for free axial movement on said driving shaft, said clutch element abutting at one end against said end thrust bearing and at the other end against one end of said driven shaft, and a clutch element on said driven shaft movable into and out of engagement with said first mentioned clutch element, said elements having coacting wedge surfaces inclined to the axes of said shafts and adapted to exert a component of force axially toward said bearing.

12. In a transmission mechanism, a hollow shaft, an axially alined shaft, said last mentioned shaft having an axial extension projecting rotatably through said hollow shaft, the free outer end of said extension being accessible to afford means for rotating said alined shaft, and separable coacting clutch elements on said respective shafts for operating one shaft from the other.

J. E. McADAMS.
WARREN D. BURTON.